Feb. 21, 1956

R. M. TUCK 2,735,267

FLUID TORQUE CONVERTER CONSTRUCTION

Filed May 21, 1952

Inventor
ROBERT M. TUCK
By Barnes Kisselle Laughlin & Raisch
Attorneys

United States Patent Office 2,735,267
Patented Feb. 21, 1956

2,735,267

FLUID TORQUE CONVERTER CONSTRUCTION

Robert M. Tuck, Indianapolis, Ind., assignor to General Motors Corporation, Detroit, Mich., a corporation of Delaware Application May 21, 1952, Serial No. 289,116

4 Claims. (Cl. 60—54)

This invention relates to a fluid torque converter of the type having an impeller, a turbine and one or more stators which form a torus chamber.

Such torque converters are, from a general standpoint, known to those versed in the art, and the liquid in the torus chamber is supplied thereto under pressure and also pressures in the torus chamber develop in the operation thereof.

Such pressure of the liquid medium employed in the torque converter, which for convenience may be termed "oil," sets up axial thrust on some of the parts which must be overcome by a bearing where parts are relatively rotatable. An object of the invention is to provide a torque converter with a seal structure for controlling the torus chamber pressure and for containing the torus chamber pressure in such a manner that the pressure is prevented from having access to a large area on the face of a member with resultant thrust. The thrust on the member is accordingly reduced thus resulting in a lower thrust upon and a longer life of the bearing construction for taking such thrust.

A torque converter illustrating the invention as shown in the accompanying drawing.

Figure 1:
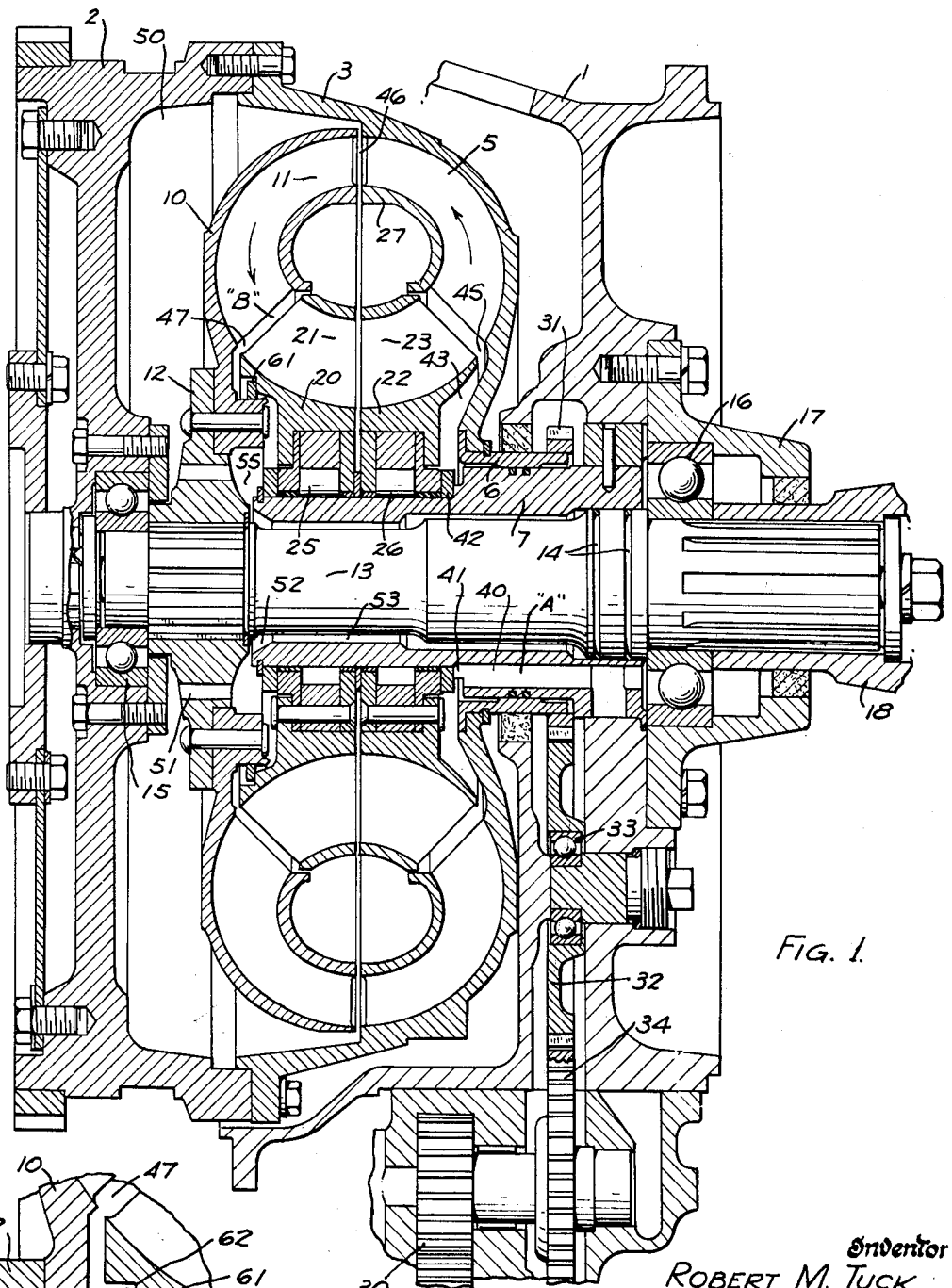
Fig. 1 is a view in cross section showing a torque converter and illustrating some of the parts in broken fashion.
Figure 2:
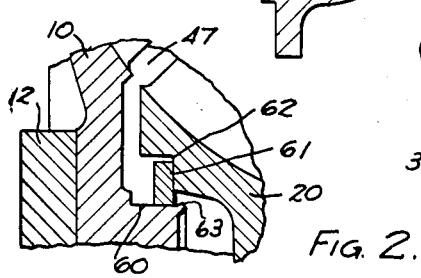
Fig. 2 is an enlarged sectional view illustrating the seal structure.

While the torque converter is illustrated rather fully in Fig. 1, many of the parts are well known and, therefore, the description of the converter, particularly as to the well known parts, need not be in great detail. A housing member is illustrated at 1 and the fly wheel of a driving engine is shown at 2. Mounted on this fly wheel is the impeller member 3 of the torque converter having vanes or blades 5. A hub portion 6 secured through the vanes or blades 5 is associated with a part of the housing and a stationary sleeve conveniently called a ground sleeve 7 by means of seal structures as shown.

The driven member or turbine is shown at 10, the same having blades or vanes 11 and it has a hub 12 splined or otherwise secured to the power output shaft 13. This shaft lies within the sleeve 7, has a seal arrangement with the sleeve as shown at 14. One end is piloted in a bearing 15 mounted in the fly wheel and its other end is journalled in a bearing 16 which is carried by a cap member 17, while its extreme end has mounted thereon a torque transmitting member 18. One or more stators are associated with the ground sleeve and as shown herein there are two of such stators. One stator is illustrated at 20 and it has blades 21 while the other stator 22 has blades 23. Each stator is associated with the ground sleeve by means of an overrunning or one-way drive coupling illustrated at 25 and 26. Thus the impeller, turbine and stators provide a torus chamber and each of the members has a core portion cooperating to form a core 27 of the torus chamber.

As is well known to those versed in the art, the oil in the torus chamber is impelled by the blades 5 of the impeller and caused to flow in the direction of the arrows, and the same impinges upon the blades in the turbine to drive it, while the blades of the stators, under some conditions, change the direction of the flow of the oil and direct the same back to the impeller.

Oil is supplied to the torus chamber by a suitable pump and caused to flow therethrough, thus effecting a change of oil so that it may be kept suitably cooled, and a pump for such purpose is illustrated at 30, the same being shown as a form of gear pump. The pump is driven, in the form shown herein, by a gear 31 mounted on the hub 6 of the impeller 3 which drives an intermediate gear 32 journalled as at 33 which, in turn, drives a pump gear 34.

Through passages not shown, oil is delivered under pressure from the pump to a passage 40 in the ground sleeve. This oil flows into the torus chamber through the clearance 41 between the hub 6 on the impeller and a retaining member 42 for the stator 22, and thence into the area or space 43 between the stator 22 and the wall of the impeller. From here the oil may flow into the torus chamber through the space or clearance 45 between the stator 22 and the impeller. The torus chamber, of course, is not a liquid sealed structure, and the oil which is pumped into it under pressure discharges therefrom, one place of discharge being through the clearance at the intersection of the impeller and turbine as shown at 46. A further place where the liquid tends to discharge is in the vicinity of the area or clearance 47 between the outlet end of the turbine and the inlet end of the stator 20.

The discharged oil flows into the space 50 between the turbine and the fly wheel from where it may pass through ports 51 in the turbine hub thence through clearance 52 into the space 53 between the shaft 13 and the ground sleeve 7. This space 53 is open to exhaust (not shown). The oil which tends to escape through the area 47 would, if it should escape, pass into the area 55 between the stator 20 and the hub of the turbine from where it may flow through the clearance 52 into the area 53.

It has been found that during the operation of the torque converter which, as above described, is supplied with oil under pressure that a relatively high pressure is developed on the liquid in the torus chamber in the region of the discharge end of the turbine. This is in the region of the intersection or proximity of the turbine blades 11 with the stator blades 21. This high pressure condition tends to cause the oil to discharge and flow out substantially at the clearance 47 between the turbine and the stator 20. If this high pressure has access to the area 55, the pressure is exerted over a relatively large area of the turbine hub, thus placing a thrust to the left as Fig. 1 is viewed which is taken by the bearing 16. This results in excessive loads on the bearing and tends to shorten its life. If sufficient holes or apertures, such as the apertures 51, are placed in the turbine hub in an attempt to equalize the pressure on opposite sides of the turbine, then an objectionably high pressure will develop over the relatively large area bounding the area 50 which would then tend to separate the turbine and the fly wheel, thus excessively loading bearing 15 and reducing its life.

Accordingly, a seal is provided to prevent high pressure within the torus chamber in the vicinity of the outlet end of the turbine from reaching the chamber 55. Such a seal is preferably of a simple face type. The hub portion of the turbine is provided with a circumferential surface 60 over which is placed a sealing ring 61. The stator 20 is formed with a radial face 62 against which the sealing ring is adapted to about. The sealing ring 61, while having a close fit with the circumferential surface 60 is, nevertheless, slidable thereon, and for convenience in assembly, the hub portion of the turbine at the end diameter of the surface 60 may have a projecting portion 63 fashioned outwardly by staking or spinning to hold the sealing ring in assembly on the turbine.

In the operation of the torque converter, the sealing ring is held up against the face 62 by the differential pressures. In other words, the high pressure oil in the vicinity of the area 47 has access to one side of the ring 61, which is the left side as the drawings are viewed, and thus the ring is urged against the face 62. This contains the high pressure and prevents it from reaching the areas 55 and 50. This materially reduces the thrust on the turbine and fly wheel and reduces the thrust on the bearings 15 and 16 thus greatly increasing their life. The escaping oil, however, has free circulation through the area 50 ports 51 in the hub, into the area 55, but at a lower pressure than it would otherwise be, and thence into the discharge area 53.

I claim:

1. A fluid torque converter comprising, an impeller, a turbine member, and at least one stator member, all having outer walls, and all cooperating to form a torus chamber adapted to be maintained full of liquid under pressure and in which the liquid flows while operating, for the transmission of torque from the impeller member to the turbine member, there being a clearance between the outlet end of the turbine member and the inlet end of the stator member which forms a passage between their outer walls, the turbine member and stator member having hub portions outside the torus chamber which define a space therebetween, the outer portion of the space joining with the said passage between the outer walls of the turbine member and stator member, the turbine member having a cylindrical surface positioned adjacent the outer portion of said space, the stator member having a substantially radial surface positioned radially outwardly of the cylindrical surface on the turbine member and adjacent the said passage and facing toward the said passage, and a sealing ring having an axial dimension less than that of said cylindrical surface and freely axially slidable on the cylindrical surface of the turbine member and subject on one side to pressure of the liquid in the said passage to be held thereby with its opposite side seating against the radial face of the stator member, to thereby contain the liquid pressure and prevent same from access into said space, thereby relieving the turbine member of axial thrust on its said hub portion.

2. A fluid torque converter comprising, an impeller, a turbine member, and at least one stator member, all having outer walls, and all cooperating to form a torus chamber adapted to be maintained full of liquid under pressure and in which the liquid flows while operating, for the transmission of torque from the impeller member to the turbine member, there being a clearance between the outlet end of the turbine member and the inlet end of the stator member which forms a passage between their outer walls, the turbine member and stator member having hub portions outside the torus chamber which define a space therebetween, the outer portion of the space joining with the said passage between the outer walls of the turbine member and stator member, one member having a cylindrical surface positioned adjacent the outer portion of said space and which has one free edge, the other member having a substantially radial surface positioned radially outwardly of the said cylindrical surface and adjacent said passage and facing toward said passage, and a sealing ring freely axially slidable on said cylindrical surface of the one member and subject on one side to pressure of the liquid in said passage to be held thereby with its opposite side seating against said radial face of the other member, to thereby contain the liquid pressure and prevent same from access into said space, thereby relieving the turbine member of axial thrust on its hub portion.

3. A fluid torque converter comprising an impeller, a turbine member, and at least one stator member, all having outer walls, and all cooperating to form a torus chamber adapted to be maintained full of liquid under pressure and in which the liquid flows while operating, for the transmission of torque from the impeller member to the turbine member, there being a clearance between the outlet end of the turbine member and the inlet end of the stator member which forms a passage between their outer walls, the turbine member and stator member having hub portions outside the torus chamber which define a space therebetween, the outer portion of the space joining with the said passage between the outer walls of the turbine member and stator member, one member having a cylindrical surface projecting from its hub portion and positioned adjacent the outer portion of said space, said cylindrical surface having a free edge, the other member having a surface extending in a direction outwardly from its hub and positioned radially outwardly of the cylindrical surface on the one member and facing toward said passage, and a sealing ring freely axially slidable on the said cylindrical surface on the one member and subject on one side to pressure of the liquid in said passage, to be held thereby with its opposite side against the said surface on the other member, to thereby contain the liquid pressure and prevent same from access into said space, thereby relieving the turbine member of axial thrust on its said hub portion.

4. A fluid torque converter comprising, an impeller, a turbine member, and at least one stator member, all having outer walls, and all cooperating to form a torus chamber adapted to be maintained full of liquid under pressure and in which the liquid flows while operating, for the transmission of torque from the impeller member to the turbine member, there being a clearance between the outlet end of the turbine member and the inlet end of the stator member which forms a passage between their outer walls, the turbine member and stator member having hub portions outside the torus chamber which define a space therebetween, the outer portion of the space joining with the said passage between the outer walls of the turbine member and stator member, the turbine member having a circumferential extension projecting from its hub portion with a cylindrical outer surface, the stator member having a substantially radially disposed surface positioned radially outward of and overlapping the cylindrical surface of the extension, said cylindrical surface and the radial surface being positioned adjacent the outer part of said space with the radial surface facing toward said passage, and a sealing ring having an axial dimension less than that of the said circumferential surface and freely axially slidable on the cylindrical surface of the extension of the turbine member and subject on one side to the pressure of the liquid in said passage, to be held thereby with its opposite side seating against the radial face of the stator member, to thereby contain the liquid pressure and prevent same from access into said space, thereby relieving the turbine member of axial thrust on its hub portion.

References Cited in the file of this patent

UNITED STATES PATENTS

| | | |
|---|---|---|
| 2,168,862 | De Lavaud | Aug. 8, 1939 |
| 2,293,767 | Salerni | Aug. 25, 1942 |
| 2,371,337 | Long | Mar. 13, 1945 |
| 2,418,362 | Miller | Apr. 1, 1947 |
| 2,462,652 | Lysholm | Feb. 22, 1949 |
| 2,588,668 | Syrovy | Mar. 11, 1952 |
| 2,618,367 | Cook | Nov. 18, 1952 |